(12) United States Patent
Murasato et al.

(10) Patent No.: US 10,095,370 B2
(45) Date of Patent: Oct. 9, 2018

(54) NETWORK CONFIGURATION AND OPERATION VISUALIZING APPARATUS

(71) Applicant: National Institute of Information and Communications Technology, Tokyo (JP)

(72) Inventors: Hideki Murasato, Tokyo (JP); Takashi Kimata, Tokyo (JP); Tetsuo Toyomura, Tokyo (JP); Koji Zettsu, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 310 days.

(21) Appl. No.: 14/891,875

(22) PCT Filed: May 15, 2014

(86) PCT No.: PCT/JP2014/062910
§ 371 (c)(1),
(2) Date: Nov. 17, 2015

(87) PCT Pub. No.: WO2014/188939
PCT Pub. Date: Nov. 27, 2014

(65) Prior Publication Data
US 2016/0119204 A1    Apr. 28, 2016

(30) Foreign Application Priority Data
May 21, 2013  (JP) ................. 2013-107496

(51) Int. Cl.
*G06F 3/0481* (2013.01)
*G06T 11/20* (2006.01)
(Continued)

(52) U.S. Cl.
CPC .......... *G06F 3/0481* (2013.01); *G06T 11/206* (2013.01); *H04L 41/12* (2013.01);
(Continued)

(58) Field of Classification Search
CPC ....................................................... G06F 3/0481
See application file for complete search history.

(56) References Cited

U.S. PATENT DOCUMENTS

2006/0168207 A1* 7/2006 Choong ................. H04L 41/12
709/224
2007/0018984 A1* 1/2007 Sauvageau ............ G06T 11/206
345/440

(Continued)

FOREIGN PATENT DOCUMENTS

JP    2012-209871 A    10/2012
WO   WO 2013/066602 A1   5/2013

OTHER PUBLICATIONS

Real Time Topology Based Flow Visualization by John K. Smith Referentia Systems Incorporated Flocon 2011, Salt Lake City, UT (RFS) pp. 1-41.*

(Continued)

*Primary Examiner* — William Bashore
*Assistant Examiner* — Nathan Shrewsbury
(74) *Attorney, Agent, or Firm* — Renner Otto Boisselle & Sklar, LLP (57) ABSTRACT

[Object] To provide a network visualizing apparatus giving a user to have a clear perspective of network configuration and operation.
[Solution] The visualizing apparatus for monitoring a network having logical configuration changeable by software interpreting a network control command includes a display device 98, a first drawing unit drawing a first image 92 representing cooperation between services provided on the network on the display device 98, and a second drawing unit drawing a second image 98 representing what connection between which node and which switch realizes the service cooperation on the network, on the display device. The first and second drawing units update drawings of a service (Continued)

cooperation execution monitoring window 92 and a network configuration monitoring window 98, respectively, in a synchronized manner. A log 94 representing result of interpretation of descriptions describing cooperation between services and a log 96 representing network status may also be displayed in a synchronized manner.

5 Claims, 9 Drawing Sheets (51) Int. Cl.
    *H04L 12/26*     (2006.01)
    *H04L 12/24*     (2006.01)

(52) U.S. Cl.
    CPC ............ *H04L 41/22* (2013.01); *H04L 43/045* (2013.01); *G06T 2200/24* (2013.01); *H04L 41/0806* (2013.01)

(56) References Cited

U.S. PATENT DOCUMENTS

| | | | | |
|---|---|---|---|---|
| 2008/0123586 | A1* | 5/2008 | Manser ................. | H04L 41/12 370/328 |
| 2015/0089374 | A1* | 3/2015 | Nagarajan ............... | H04L 41/12 715/734 |
| 2016/0373535 | A1* | 12/2016 | El Defrawy ............ | H04L 67/16 |

OTHER PUBLICATIONS

Anis Yousefi et al., "Identifying Distributed Features in SOA by Mining Dynamic Call Trees" 2011 27$^{th}$ IEEE International Conference on Software Maintenance (CSM), IEEE, Sep. 25, 2011, (Sep. 28, 2011), pp. 73-82, XP032010430.

Hidetsugu Sugiyama, "Programmable Network Systems: Through the Junos SDK and Junos Space SDK", World Telecommunications Congress (WTC), 2012, IEICE, Mar. 5, 2012 (Mar. 5, 2012), pp. 1-6, XP032138293.

International Search report for corresponding International Application No. PCT/JP2014/062910 dated Aug. 12, 2014.

McKeown et al., "OpenFlow: Enabling Innovation in Campus Networks" ACM SIGCOMM Computer Communication Review, vol. 38, No. 2, pp. 69-74, Apr. 2, 2008. (cited in the specification).

K. Zettsu, Y. Teranishi, and K. Nakauchi, "Advanced Sensor Information Aggregation and Analysis Platform," NICT News, pp. 1-4, Oct. 2012.

Kyoungsook Kim, "Challenges and Opportunities for Cyber-Physical Cloud Computing" Cyber-Physical Cloud Computing JPGrid Workshop38, Mar. 6, 2013.

"Network Desired in the Age of Cloud—a network can be virtualized like a server", @IT, Aug. 31, 2011, URL, http://www.atmarkit.co.jp/ad/nec/1108pflow/nec01.html.

\* cited by examiner

```
20:43:32  [r1, EaQU] identifier <+- (inserter * identifier).pairs { [ins, id] [id.me, ins.key, ins.bhv, ins.cls] }
20:43:35  [r2, EaCO] sequence <+ addrule { [add] [add.no, add.uid, time, add.src, add.dst, add.cdn, flg] }
20:43:16  [r1, RaQU] identifier <+- (inserter * identifier).pairs { [ins, id] [id.me, ins.key, ins.bhv, ins.cls] }
20:43:35  [r1, EaCO] identifier <+- (inserter * identifier).pairs { [ins, id] [id.me, ins.key, ins.bhv, ins.cls] }
20:43:03  [r2, TwCO] sequence <+ addrule { [add] [add.no, add.uid, time, add.src, add.dst, add.cdn, flg] }
20:43:03  [r2, TwCO] sequence <+ addrule { [add] [add.no, add.uid, time, add.src, add.dst, add.cdn, flg] }
20:44:29  [cr, EaPR] stdio <~ createpath { [show, seq] [src.ip, dst.ip, src.bhv, dst.bhv, ins.key, src.path, dst.path] }
20:43:26  [r1, EaPR] identifier <+- (inserter * identifier).pairs { [ins, id] [id.me, ins.key, ins.bhv, ins.cls] }
20:43:19  [r1, RaCO] identifier <+- (inserter * identifier).pairs { [ins, id] [id.me, ins.key, ins.bhv, ins.cls] }
20:42:57  [r1, TwDA] sequence <+ addrule { [add] [add.no, add.uid, time, add.src, add.dst, add.cdn, flg] }
20:43:19  [r2, RaCO] sequence <+ addrule { [add] [add.no, add.uid, time, add.src, add.dst, add.cdn, flg] }
20:43:09  [r1, RaPR] identifier <+- (inserter * identifier).pairs { [ins, id] [id.me, ins.key, ins.bhv, ins.cls] }
```

```
service traffic 3,296    EaSE, EaCO         20:42:48 SRH TwSE
service traffic 6,592    EaCO, EaSE         20:43:16 SRH TwQU
service traffic 26,256   RaDA, RaPR         20:43:02 SRH TwPR
service traffic 966,485  RaPR, RaDA         20:43:16 SRH TwDA
service traffic 26,552   RaQU, RaPR         20:43:04 SRH RaSE
service traffic 734,804  RaPR, RaQU         20:43:32 SRH RaQU
service traffic 23,269   RaPR, RaSE         20:43:19 SRH RaPR
service traffic 634,731  RaSE, RaPR         20:43:32 SRH RaDA
service traffic 0        EaDA, EaPR         20:43:21 SRH EaSE
service traffic 0        EaPR, EaDA         20:43:46 SRH EaQU
service traffic 3,296    EaSE, EaCO         20:43:33 SRH EaPR
service traffic 6,592    EaCO, EaSE         20:43:46 SRH EaDA
```

NETWORK CONFIGURATION AND OPERATION VISUALIZING APPARATUS

TECHNICAL FIELD

The present invention relates to a network management technique and, more specifically, to a network monitoring technique giving a clear perspective of various information services and behaviors of a physical network, in a Service Controlled Networking technique (hereinafter referred to as "SCN") for dynamically modifying a configuration of the physical network to satisfy requests from various information components (hereinafter referred to as "information services") arranged in a network space.

BACKGROUND ART

Development of infrastructures for data communication networks has enabled applications to use high processing performances of networks. Such networks are highly scalable and, hence, various and many information services will definitely be made available through the networks in the future.

On the other hand, thus far, only a few experts could adjust configurations of such networks and it has been very difficult for a general user to adjust a network in accordance with his/her applications. This is the same if a network is limited to one company, one university or the like. When an unexpected event occurs, even a network administrator finds it difficult to cope with it.

It is sometimes desirable to collect and process various data provided on a network, in a limited time, for a prescribed object. By way of example, when a sudden disaster hits or is expected, if a large amount of information related to situations of damage, information related to events as possible cause of the disaster and so on could be collected and processed timely, it would be possible to prevent further damage or to take necessary measures to the damage. For this purpose, it is necessary to collect formidable amount of data dispersed on the network, combine various and many information services and to execute them in an efficient manner.

In order to realize such an application, a technique that sends a request for an information service accurately and timely to a network and dynamically adjusts configuration of the network is necessary. Particularly when information generated suddenly in a scale beyond expectation is to be transferred timely by flexibly selecting paths, when a huge amount of information is to be analyzed through trial and error, or when information service is to be provided in accordance with urgency of application or importance of data, it is desirable to flexibly configure a network in a manner coordinated with the request of information service, to prevent excessive increase of cost for network management and for development of information services.

Consider a common network. On the one hand, when an application developer wishes to create a new service cooperation on-demand, only the network paths that have already been set can be used, and hence, it is impossible to maximize network performance appropriate for the information service. On the other hand, a network administrator builds a network under conditions assumed in advance and, therefore, if a trouble such as unexpected traffic overloads on an assumed path occurs, it is difficult to address the problem on highly real-time basis.

A basic technique solving these problems and enabling flexible configuration of networks is so-called Software-Defined-Network (SDN), described in M. Nick, A. Tom, B. Hari, P. Guru, P. Larry, R. Jennifer, S. Scott and T. Jonathan, "OpenFlow: Enabling Innovation in Campus Networks," SIGCOMM Computer Communication Review, pp. 69-74, 2008. SDN is a technique for setting topology and QoS (Quality of Service) of a network by software and for forming a physical network by calling an API (Application Programming Interface) or a command. SDN enables programming of a network configuration in a similar manner as software programming, and enables virtually forming a network (virtual network) on a physical network.

OpenFlow is one of the representative techniques of such SDN. OpenFlow divides functions of conventional network devices to one referred to as OpenFlow controller and ones referred to as OpenFlow switches. Devices on a network are connected to OpenFlow switches, and data can be transferred between each of OpenFlow switches.

Figure 1:
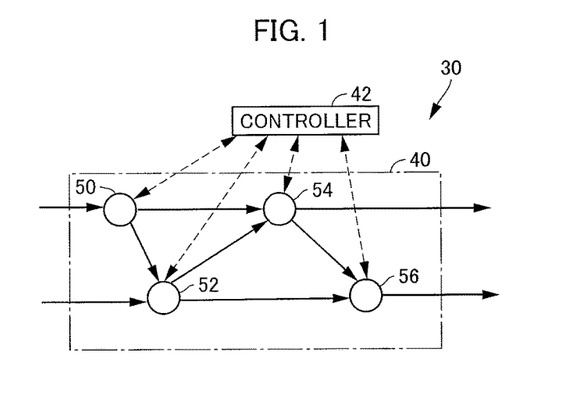
FIG. 1 is a schematic illustration showing relations between an OpenFlow controller and OpenFlow switches of OpenFlow.

Referring to FIG. 1, a network realized by OpenFlow (OpenFlow network) 30 includes a group 40 of switches including OpenFlow switches 50, 52, 54, 56 etc. actually in charge of communication and an OpenFlow controller 42 monitoring and controlling states of switch group 40. Switching by each of the switches in group 40 can dynamically be controlled through OpenFlow controller 42 in accordance with a procedure referred to as OpenFlow protocol.

OpenFlow network 30 can be controlled by software. When a user gives an instruction of a network control command for realizing a logical configuration of a virtual network to OpenFlow controller 42, OpenFlow controller 42 forms a flow table for realizing the logical configuration on a physical network, and distributes it to each of the OpenFlow switches 50, 52, 54 and 56. Each of the OpenFlow switches 50, 52, 54 and 56 transfers data in accordance with the flow table. On the other hand, the OpenFlow switches 50, 52, 54 and 56 each transmit bandwidth information of the network and the like to OpenFlow controller 42. Based on these pieces of information, OpenFlow controller 42 dynamically modifies the flow table to realize the instructed configuration of virtual network.

In this manner, the user can build a virtual network, independent from the configuration of physical network. It is unnecessary to have full knowledge of the physical network for this purpose.

On the other hand, an actual network administrator need to know on real-time basis pieces of information related to what type of virtual network is formed on the physical network of which he/she is in charge, how much traffic each path of the physical network has and so on. Since a huge number of devices are connected to the network, it is impossible by text information to comprehend such type of information.

Figure 2:
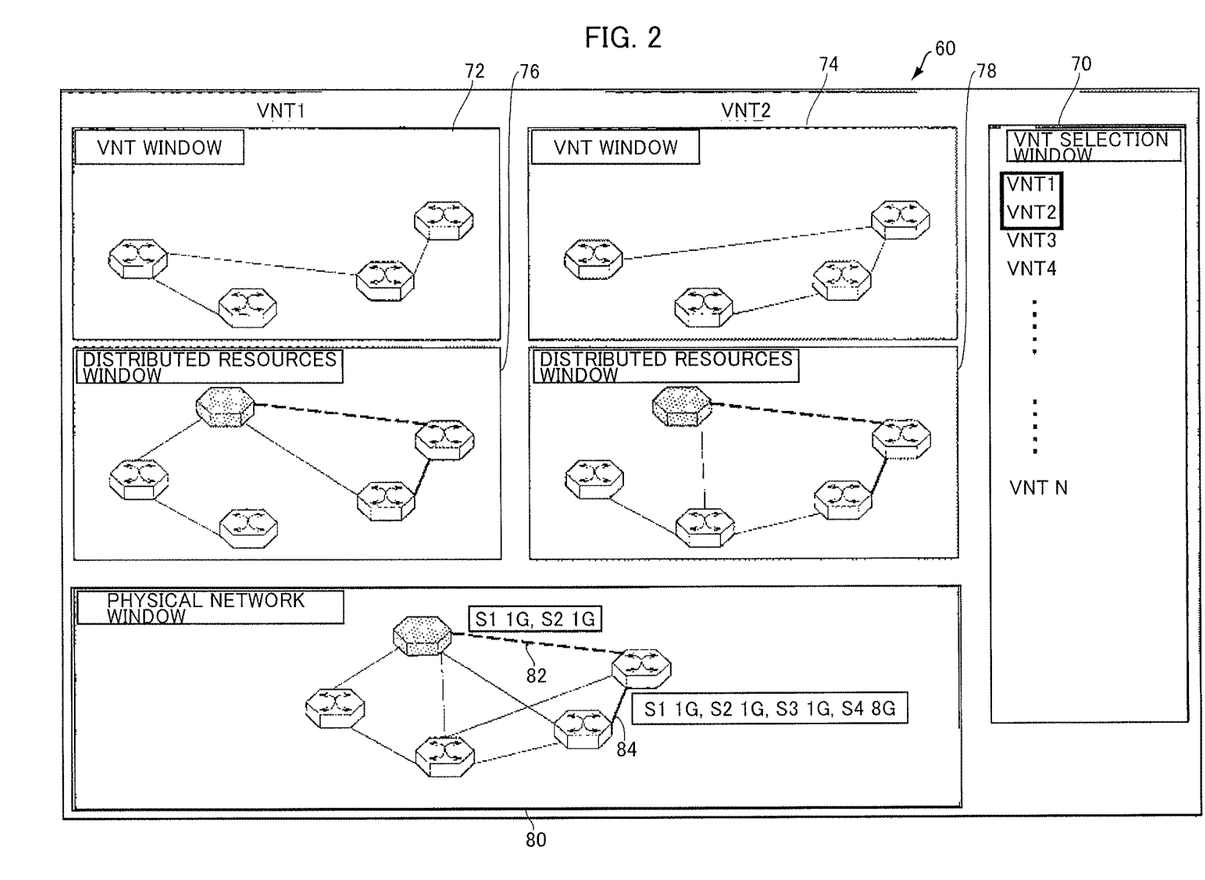
FIG. 2 shows a network management screen disclosed in '871 Reference.

Japanese Patent Laying-Open No. 2012-209871 (hereinafter referred to as '871 Reference) discloses a solution to such a problem. Referring to FIG. 2, a network management screen 60 of a network visualizing apparatus disclosed in '871 Reference allows management of physical network resources allocated to a plurality of virtual networks. Network management screen 60 includes: a VNT selection window 70 allowing selection of a virtual network to be displayed; a physical net window 80 displaying nodes included in a physical network and links (physical links) between each of the nodes; VNT windows 72 and 74 displaying logical links and routers forming the VNT selected by VNT selection window 70; and distributed resources windows 76 and 78 displaying, for each VNT, resources (physical topology of VNT and bandwidth allocated to links) allocated to each VNT. On VNT windows 72 and 74, traffic amount of data flowing through each link is also displayed.

When a link on the physical network is shared by virtual networks of which number is equal to or larger than a prescribed threshold value, physical net window 80 displays an alarm in the vicinity of the link. By way of example, in FIG. 2, there is an indication "S1 1G, S2 1G" near a link 82. This means that this link 82 is shared by virtual networks S1 and S2 and bandwidth allocated to these are 1G each. A similar indication shows that link 84 is shared by four virtual networks S1, S2, S3 and S4, and the bandwidths allocated thereto are 1G, 1G, 1G and 8G, respectively.

According to this reference, network management screen 60 as such allows the network administrator to view the state of sharing, status of resources allocation and behavior of each virtual network on the physical net, making it easier to grasp the status of virtual networks.

SUMMARY OF INVENTION

Technical Problem

The network visualizing apparatus described in '871 Reference mentioned above is considered to be effective to grasp relations between a virtual network and a physical network. The technique disclosed in '871 Reference, however, is insufficient to dynamically build a network mainly focusing on the information services as described above. Specifically, the apparatus disclosed in '871 Reference is focused on the status of use of physical network resources. This reference is silent about the status of applications using the networks or the manner how the networks are used by the applications. Therefore, each node of the graph displayed by this apparatus represents only the network devices as physical resources. As a result, it is difficult to grasp on real-time basis the status of applications using information services, as in an SCN network. Further, it is also difficult to confirm paths for data transfer between information services forming applications, on the physical network.

Therefore, an object of the present invention is to provide a network visualizing apparatus enabling a user to have a clear perspective of a configuration and activities of a network.

Solution to Problem

According to an aspect, the present invention provides a visualizing apparatus for visualizing network configuration and operation. The logical configuration of the network is changeable by software interpreting a network control command. The visualizing apparatus includes: a display device; first drawing means for drawing a first image on the display device the first image representing a cooperation between information services provided on the network; and second drawing means for drawing a second image on the display device, the second image representing what connection between which node and which switch on a physical network realizes the cooperation between the information services. The first and second drawing means update drawings in synchronization with each other.

Preferably, a plurality of cooperations may exist between the information services. The first drawing means represents each cooperation between the information services as a graph having service nodes providing the information services as vertexes and a path of data movement between the information services as an edge, and draws different edges in different colors corresponding to respective cooperations between the information services. The second drawing means displays a topology on the physical network as a graph having nodes and switches on the network as vertexes and a physical line between any of the nodes and switches on the network as an edge; and among the edges of the graph drawn by the second drawing means, along an edge representing a physical line functioning as an edge of a cooperation between the information services, the second drawing means draws a line representing a data transfer path in the same color as the drawing color of the edge.

The service cooperation may include a plurality of units. The second drawing means draws, along that one of the physical lines which functions as edges of two units among the plurality of service cooperation units, lines representing different data transfer paths in same colors as drawing colors of the two edges respectively.

More preferably, the network includes a plurality of switches, a controller controlling paths of data transfer by the plurality of switches in accordance with a network control command, and network status obtaining means for obtaining information related to status of operation of the network. The visualizing apparatus further includes rule storage means for storing a rule describing, in declarative description, a request from the cooperation between the information services to the network. The rule stored in the rule storage means includes a condition to be satisfied by status of the network or status of the information services and a process or processes to be executed when the condition is satisfied. Any of the processes includes a process for issuing a control command to the controller in accordance with the rule. The visualizing apparatus further includes rule interpreting means for repeatedly determining whether any of the rules stored in the rule storage means has the condition satisfied based on the information related to the information service and based on information obtained by the network status obtaining means, and executing the process defined by the rule of which condition is satisfied; rule execution log storage means for storing logs of process execution in accordance with the rule by the rule interpreting means; and third drawing means for repeatedly reading execution logs stored in the rule execution log storage means and for drawing on a screen of the display device in synchronization with drawings by the first and second drawing means.

The visualizing apparatus may further include fourth drawing means for drawing information obtained by the network status obtaining means on the screen of the display device in synchronization with drawing by the third drawing means.

BRIEF DESCRIPTION OF DRAWINGS

FIG. 5 is a window showing a service cooperation history, on the screen shown in FIG. 3.

FIG. 6 is a window showing a network control command history, on the screen shown in FIG. 3.

DESCRIPTION OF EMBODIMENTS

In the following description and in the drawings, the same components are denoted by the same reference characters. Therefore, detailed description thereof will not be repeated.

Figure 3:
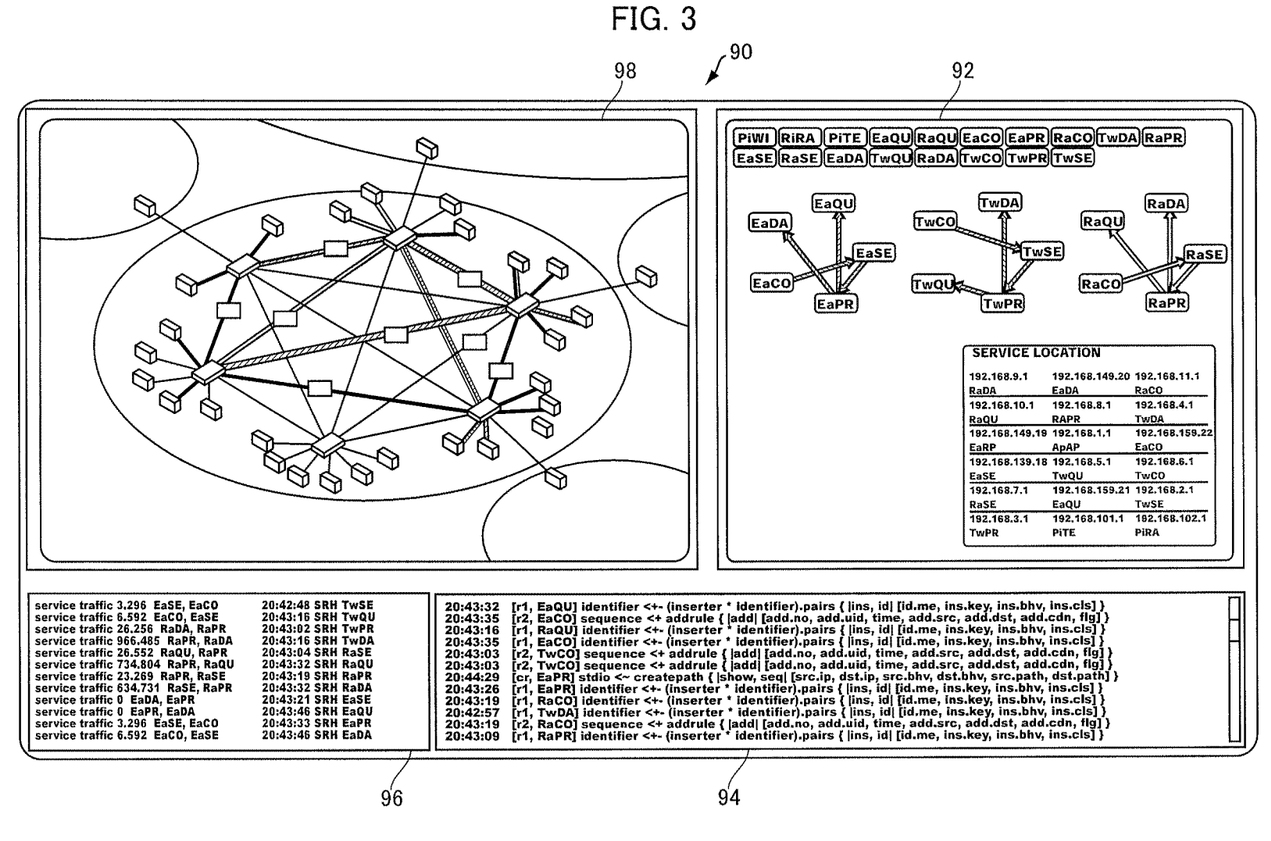
FIG. 3 shows a screen of the visualizing apparatus displaying a network status in accordance with an embodiment of the present invention.

Referring to FIG. 3, a monitoring screen 90 of a network visualizing apparatus in accordance with an embodiment of the present invention includes an execution monitoring window 92 of service cooperations built on the network as an object of monitoring. Configuration of service cooperation is described as a set of rules by declarative descriptions referred to as DSN, as will be discussed later. Each rule includes a condition or a set of conditions to be satisfied by a network status and an information service status and a process to be executed when the condition or the set of conditions are satisfied (when the rule is fired). Any of the processes defines a process of generating a network control command of OpenFlow.

The network management system includes middleware, which will be described later, for converting the declarative descriptions to a control command of OpenFlow. When the middleware processes fired one of the rules described in DSN description and generates a network control command, the middleware processes in accordance with pre-prepared conversion rule to convert to an OpenFlow command. When service cooperation changes, the middleware generates an OpenFlow command to reflect the change in DSN description, and transmits the command to OpenFlow controller. OpenFlow controller re-configures the flow table in accordance with the command, and distributes it to OpenFlow switches under control, whereby the physical network is re-configured to satisfy requirements of service cooperation application.

Monitoring screen 90 further includes: a rule execution log display window 94 displaying a history (logs) of rule execution results by the middleware described above; a window (network control command display window 96) showing logs of traffic information between a network control command issued to OpenFlow controller and information services; and a network configuration monitoring window 98 displaying a change in network configuration caused by execution of a network control command and by a change in network status.

In the present embodiment, on monitoring screen 90, service cooperation execution monitoring window 92, rule execution log display window 94, network control command window, and network configuration monitoring window 98 are all displayed simultaneously. Further, if there is any change in service cooperation, the change is reflected on real-time basis to service cooperation execution monitoring window 92, and the log of rule execution results by the middleware and logs of network control command issued as a result of rule execution are also displayed on the real-time basis. If there is any change in the physical network configuration as a result of the network control command, the change is reflected on network configuration monitoring window 98.

Figure 4:
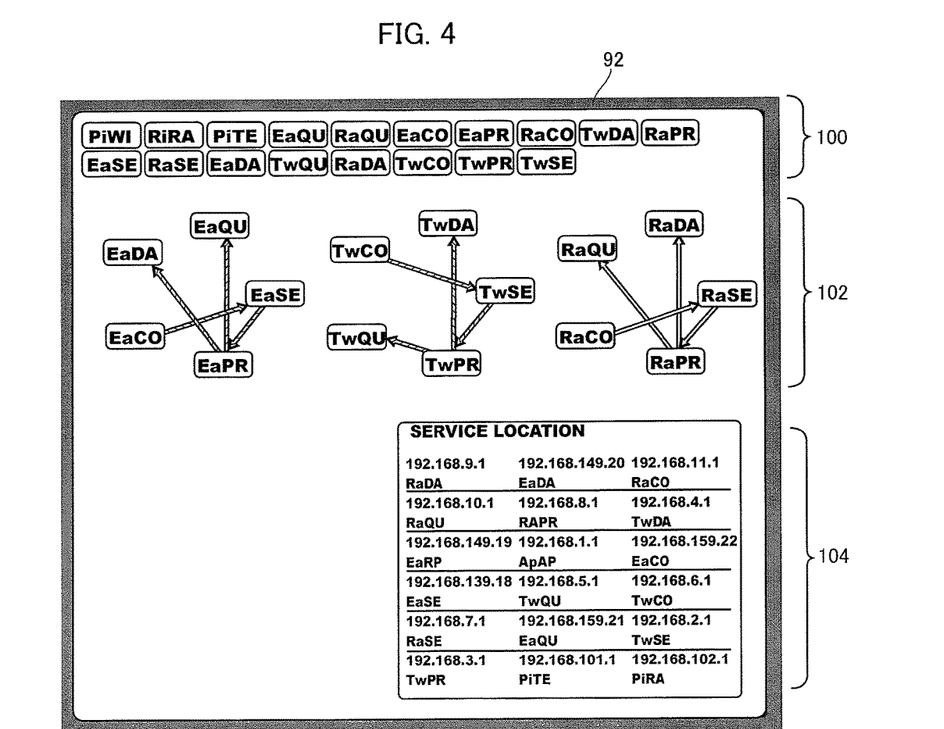
FIG. 4 shows a window showing an application operation history, on the screen shown in FIG. 3.

Referring to FIG. 4, service cooperation execution monitoring window 92 includes: service information display area 100 displaying information of information service (service information) provided on the network; a service cooperation graph display area 102 representing a service cooperation graphs having each information service as a vertex and a communication path between each information path as an edge, for each service cooperation application defined as a relation between the information services; and a service position display area 104 displaying, by an IP address, the position on the network of each information service displayed in service information display area 100.

Each information service name displayed on service information display area 100 is abbreviated in accordance with a prescribed rule and indicated by four alphabets. The information service names are commonly used on service cooperation graph display area 102 and service position display area 104 as well as on other windows.

Figure 7:
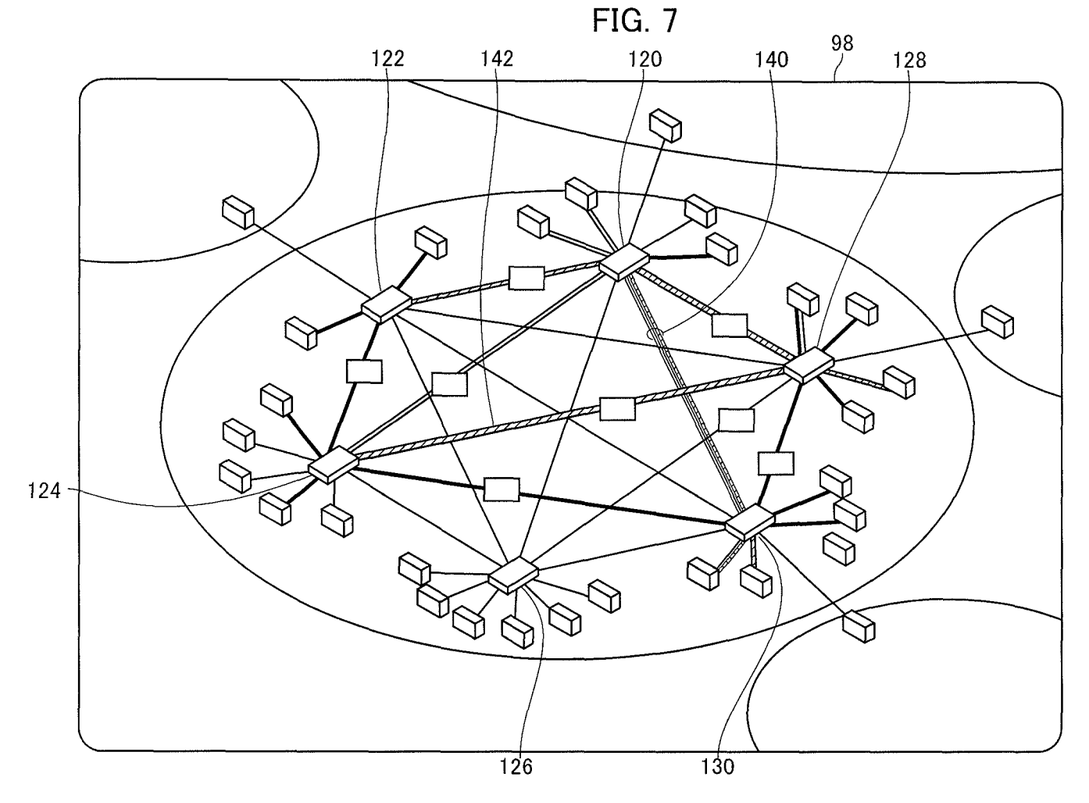
FIG. 7 is a window showing a network configuration, on the screen shown in FIG. 3.

The edges of service cooperation graph displayed on service cooperation graph display area 102 are drawn in different colors for different service cooperations. Each color is also used for a path allocated to the corresponding information service, among the paths on network configuration monitoring window 98.

Referring to FIG. 5, on rule execution log display window 94, logs representing history of execution of DSN descriptions by the middleware are displayed. DSN describes rules for application enabling cooperation of various information services as a state or statements. In the following description, each statement in the DSN description will be simply referred to as a "rule." By way of example, a rule that "execution of a certain information service requires a result of processing of another information service, and the result should satisfy a specific condition" is described as DSN. These rules are declarative descriptions simply describing what is to be done, and silent about how to execute the process.

Based on the DSN description and on information related to network behavior applied from OpenFlow controller, the middleware determines, rule by rule, whether the condition to execute the rule is satisfied or not. If the condition for the rule is not satisfied, the rule is not executed and determination of the next rule takes place. If the condition for the rule is satisfied (if the rule is fired), the process described by the rule is executed. By such a chain of processes, if any change is necessary to the network, a network control command to realize the change is generated and applied to OpenFlow controller.

The information related to each information service of service information display area 100 and service position display area 104 is drawn using the rule execution logs obtained from the middleware. Each graph of service cooperation graph display area 102 is drawn, for each service cooperation, from the logs of execution of commands for setting paths between information services in the DSN description. The edge color of the graph for each service cooperation is determined based on a path identifier (used by a network management device in OpenFlow controller for controlling the network) returned from OpenFlow controller when the command for setting a communication path between information services is executed.

On rule execution log display window 94 shown in FIG. 5, history of rules executed by the middleware is displayed on real-time basis. Here, each rule is displayed in the same color as the service cooperation edge described by the original DSN description.

Referring to FIG. 6, network control command display window 96 includes: a traffic log display area 110 displaying logs of traffics obtained from OpenFlow controller generated between information services; and a control command display area 112 displaying history of execution of control commands from each node received by OpenFlow controller.

Referring to FIG. 7, the display on network configuration monitoring window 98 includes a graph of network configuration, drawn based on topology information of network obtained from OpenFlow controller and on connection relation between network nodes and switches 120, 122, 124, 126, 128 and 130. In the graph, network nodes and switches are represented as vertexes, and physical lines connecting them are represented as edges. The display of network configuration monitoring window 98 further includes images representing amount of traffic, drawn based on traffic information of each physical line obtained from OpenFlow controller, on the physical lines between nodes and switches.

The display further includes images of transfer paths, representing paths of data transfer allocated to respective information services, displayed in colors determined application by application, based on path information obtained from OpenFlow controller and on execution logs of service cooperation obtained from the middleware. Each image of transfer path is drawn in a thickness corresponding to the amount of traffic, separately for each information service. These images are drawn almost on real-time basis with minimum delay necessary for collecting logs of a prescribed time period, as will be described later.

By way of example, a path 142 of FIG. 7 is drawn only by a thick yellow line. This means that on service cooperation execution monitoring window 92 shown in FIG. 4, this physical line is used as a path for transferring data for the service cooperation of which edge is drawn in yellow. A path 140 is drawn by red and yellow lines. This means that on service cooperation execution monitoring window 92 shown in FIG. 4, this physical line is used as a path for transferring data for the service cooperation of which edge is drawn in yellow and for the service cooperation of which edge is drawn in red. The same applies to other lines. In the present embodiment, every time traffic generates on the network, a line representing a transfer path corresponding to the information service that caused the traffic on the network configuration monitoring window 98 and an edge portion of the graph of corresponding service cooperation of service cooperation execution monitoring window 92 are drawn in the same color.

Figure 8:
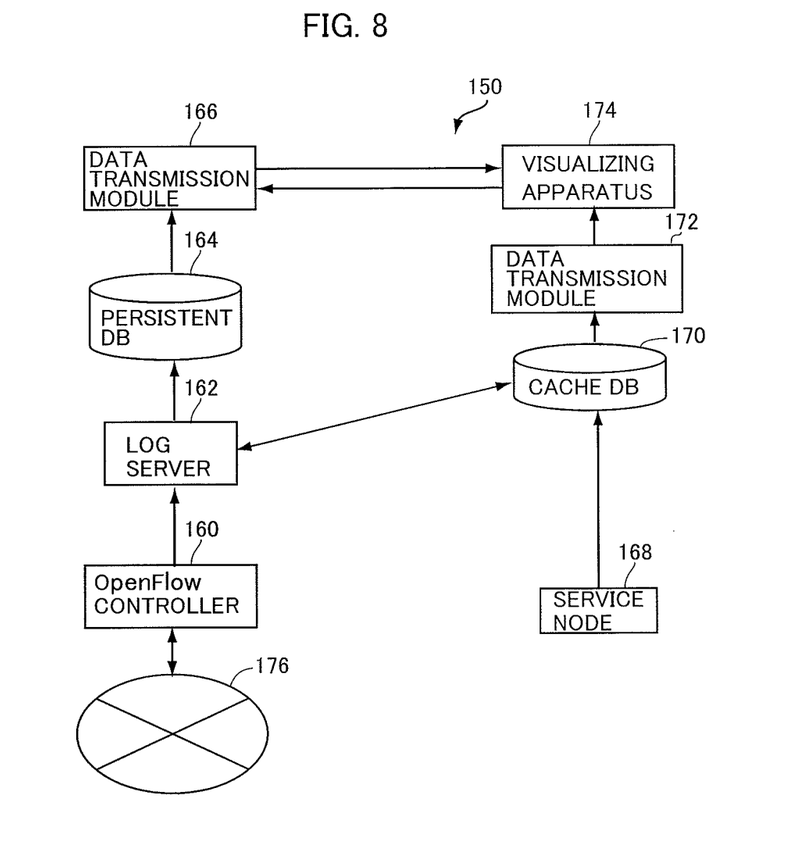
FIG. 8 is a block diagram showing a configuration of the network visualizing apparatus in accordance with an embodiment of the present invention.

To enable various drawings described above on the visualizing apparatus, pieces of information for that purpose must be collected. FIG. 8 shows, in the form of a block diagram, a configuration of a back-end system for collecting information. The pieces of information necessary for the drawings are collected at different timing. Data are obtained at various positions dispersed on the network. Further, some data may be transmitted on real time to the visualizing apparatus while the visualizing apparatus must explicitly act to get other data. Therefore, even when data are collected simply, it is difficult to realize synchronized display of these.

Therefore, in the present embodiment, between the visualizing apparatus and a service node as a position providing an information service, and between the visualizing apparatus and OpenFlow controller, caches are provided to enable synchronized distribution of data to the visualizing apparatus.

Referring to FIG. 8, back-end system 150 includes: a visualizing apparatus 174 having a display device displaying the above-described monitoring screen 90; a cache DB 170, caching pieces of information related to an information service provided by a service node 168 and shaping them to a prescribed format; and a log server 162, caching pieces of information related to execution of network control command by OpenFlow controller 160 controlling OpenFlow network 176 and pieces of information related to status of OpenFlow network 176 collected by OpenFlow controller 160 and shaping them to a prescribed format. Log data accumulated in log server 162 are periodically transferred to cache DB 170.

Back-end system 150 further includes: a data transmission module 172 for transmitting information accumulated in cache DB 170 to visualizing apparatus 174 at every prescribed time interval; a persistent DB 164 storing information necessary for drawing persistent configuration of the network, on network configuration monitoring window 98 of FIG. 7, such as a physical topology of the network, among the log data accumulated in log server 162; and a data transmission module 166 for transmitting data stored in persistent DB 164 to visualizing apparatus 174 at timing of re-drawing of network configuration monitoring window 98, such as at the time of initialization of visualizing apparatus 174.

Figure 9:
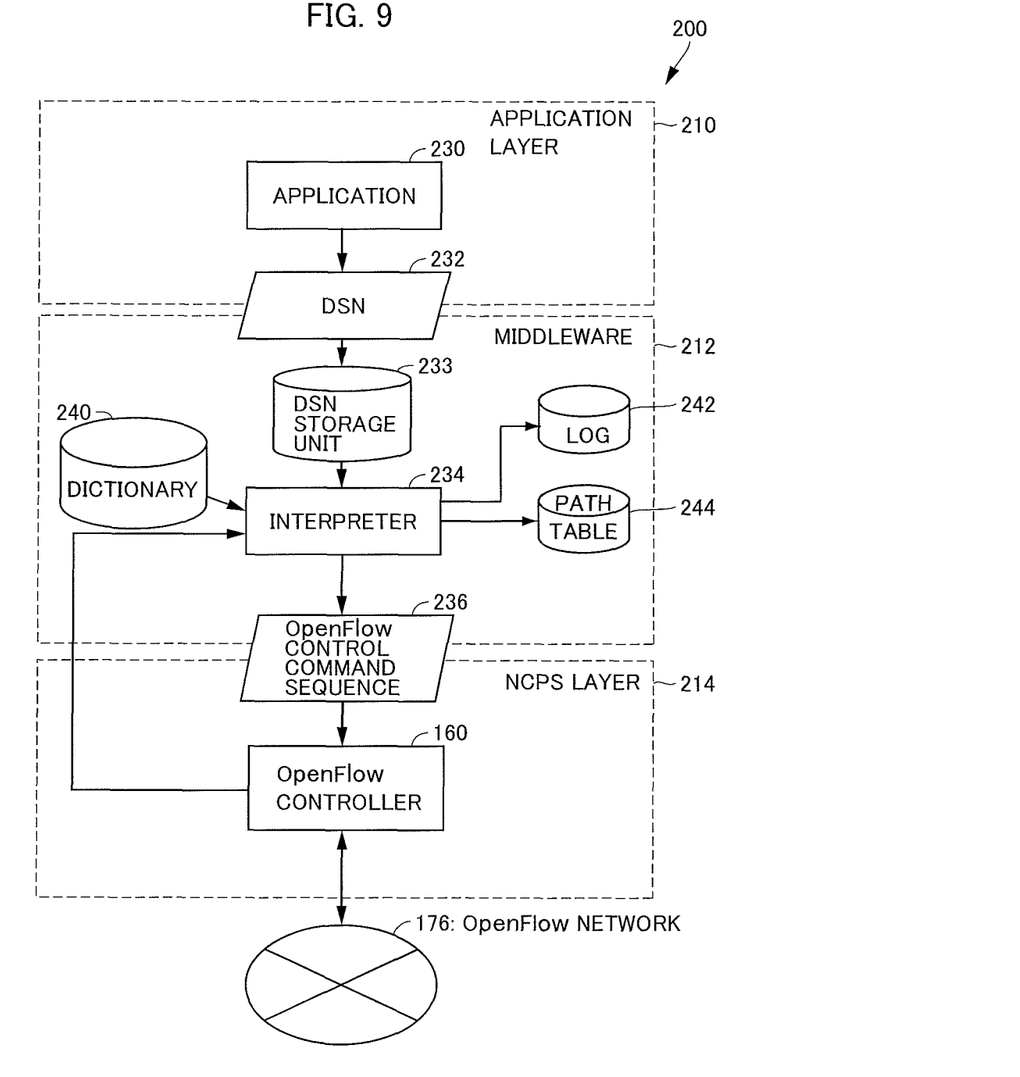
FIG. 9 shows, in the form of a block diagram, a flow of generating a control command sequence from a service cooperation application to OpenFlow controller.

FIG. 9 shows, in the form of a block diagram, a process flow in which a DSN description generated by an application realized by service cooperation is interpreted by the middleware and thereby a network control command is generated.

Referring to FIG. 9, a network control system 200 in accordance with an embodiment of the present invention includes: an application layer 210 outputting a DSN description 232 describing an application request; an NCPS layer 214 controlling network configuration; and middleware 212 positioned between application layer 210 and NCPS layer 214, for interpreting the DSN description 232 as needed and outputting an OpenFlow control command sequence and applying it to NCPS layer 214. Though only the OpenFlow control command is described as the output command in the following in order to make the description easier to understand, network control system 200 may be configured to enable control of a network different from the OpenFlow network, such as a PIAX network.

NCPS defines a different set of commands for controlling the network for a different network protocol. Specifically, NCPS includes the following commands:

(1) a group of commands for searching for a network node on which a specific information service is operating;

(2) a group of commands for forming a communication path (path) between nodes; and (3) a group of commands for monitoring a state of a node.

By way of example, in OpenFlow, node searching is implemented by a node list reference command, path formation is implemented by a path setting command, and state monitoring is implemented by a switch statistics information collection command.

Application layer 210 includes an application 230, which describes a desired information service cooperation and outputs a specification of a network, necessary for realizing the service cooperation, as a DSN description 232. The designer of application 230 may describe cooperation of information services in a form of a network diagram using GUI of the computer, and may output it as a DSN description 232 as needed. If contents of service cooperation change in application 230, DSN description 232 also changes accordingly.

Middleware 212 includes: a DSN storage unit 233 for storing DSN description 232 output from application layer 210; an interpreter 234 monitoring network status received from NCPS layer 214, repeatedly determining whether any rule in DSN description 232 is fired and, if any rule is fired, outputting an OpenFlow control command sequence 236 in accordance with the rule; a dictionary 240 describing conversion rules, used by interpreter 234 when a DSN rule is to be converted to an NCPS control command sequence; a log storage device 242 storing logs of rule execution by interpreter 234; and a path table storage unit 244 storing, in the form of a table, a path identifier received as a return value when interpreter issues a path allocation instruction to a certain application, in association with a service cooperation application.

As shown in FIG. 9, interpreter 234 obtains a status of operation (network status) of OpenFlow network 176 from OpenFlow controller 160 and determines whether each rule is fired or not, using the information.

Dictionary 240 stores conversion rules for OpenFlow. It is noted that the "conversion rule" here is different from the "rule" in DSN description. The table of path identifier stored in path table storage unit 244 is used for drawing, in synchronized manner, the display of traffic shown in FIG. 7 and the edge between information services corresponding to the traffic in each service cooperation shown in FIG. 4. The table is also used for synchronizing displays of a specific rule displayed on rule execution log display window 94, a traffic generation log generated as a result of execution of the rule, and a control command from each node received by OpenFlow controller.

Interpreter 234 selectively generates OpenFlow control command sequence 236 or a network control command sequence of a different system, not shown, depending on whether the network designated by DSN description 232 is of OpenFlow or not. Specifically, interpreter 234 determines whether or not dictionary 240 is to be used, depending on whether DSN description 232 designates OpenFlow or not. The network control command is determined by the fired DSN rule, using the dictionary. Details of this selection will not be described in the following, since it is not directly related to the present invention.

NCPS layer 214 includes an OpenFlow controller 160, connected to OpenFlow network 176, forming a flow table by executing OpenFlow control command sequence 236 and controlling each of the switches of OpenFlow network 176 using the table.

Figure 10:
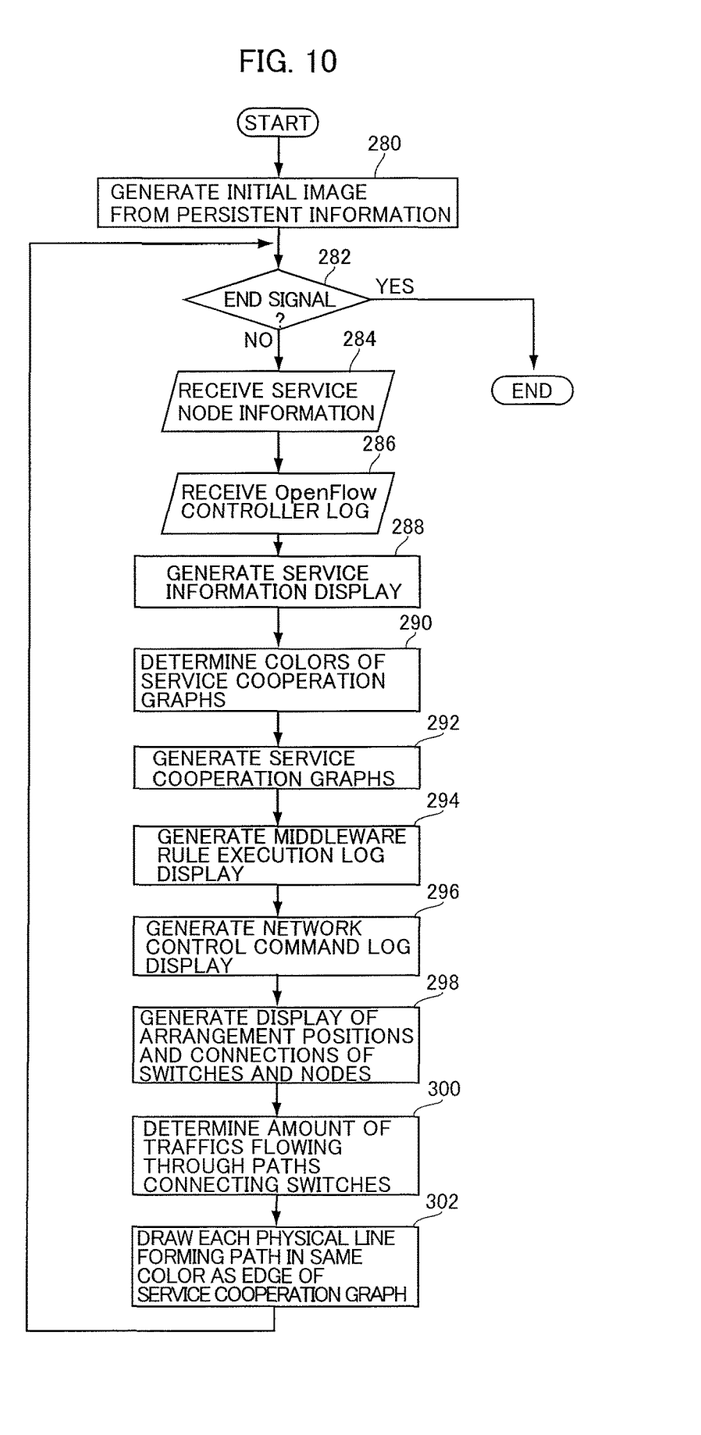
FIG. 10 is a flowchart representing a control structure of a program for realizing the visualizing apparatus show in FIG. 8.

FIG. 10 shows, in the form of a flowchart, a control structure of a program for realizing the function of visualizing apparatus 174. The flowchart represents not the exact control structure of the actual program but rather represents behavior of visualizing apparatus 174 resulting from collaboration with various objects and the like.

The program includes: a step 280 of generating, at the time of power-on of visualizing apparatus 174, persistent display related to the network configuration, based on information read from persistent DB 164; a step 282 of determining whether or not a signal instructing end of the program is received, and ending the process if an end signal is received; a step 284, executed if it is determined that no end instruction is received, of receiving service information from cache DB 170 shown in FIG. 8 at every prescribed time interval; a step 286 of receiving logs related to the network from log server 162 shown in FIG. 8; a step 288 of generating displays on service information display area 100 and service position display area 104 of service cooperation execution monitoring window 92 shown in FIG. 4; a step 290 of determining colors of edges of the service cooperation graph displayed on service cooperation graph display area 102 of FIG. 4; and a step 292 of drawing the service cooperation graphs on service cooperation graph display area 102 using the colors determined at step 290. At step 290, for service cooperation graphs of which edge colors have already been determined, existing colors are used; for a service cooperation graph to be newly created, a display color different from existing ones is adopted.

The program further includes: a step 294, following step 292, of reading logs of rule execution of middleware 212 shown in FIG. 9 from log storage device 242 and displaying them on service position display area 104 of FIG. 4; and a step 296 of displaying, based on the logs of OpenFlow controller received at step 286, logs of traffic generation between services and logs of execution of network control commands at each node, on traffic log display area 110 and control command display area 112, respectively, of network control command display window 96 shown in FIG. 6.

The program further includes: a step 298 of drawing switches and nodes and connections therebetween on network configuration monitoring window 98 shown in FIG. 7; a step 300 of determining an amount of traffic flowing through a physical line connecting switches, based on logs from OpenFlow controller; and a step 302 of determining thickness and color representing the traffic based on the amount of traffic determined at step 300 and on the edge color of the cooperation graph of information services using the path, and drawing the line on network configuration monitoring window 98 shown in FIG. 7 and then returning the control to step 282.

The series of processes from step 284 onwards is executed at every prescribed time interval. Therefore, service cooperation execution monitoring window 92, rule execution log display window 94, network control command display window 96 and network configuration monitoring window 98 on monitoring screen 90 shown in FIG. 3 are updated in synchronization with each other. Therefore, when data is transmitted/received between information services of each service cooperation application, the edge of the corresponding service cooperation graph is displayed in high-lighted manner. In synchronization therewith, the path corresponding to the data transmission path on network configuration monitoring window 98 is also displayed in the same color in high-lighted manner. Further, the logs of rule execution at that time are also displayed on rule execution log display window 94 in the same color, and the network control command issued as a result of execution of the rule is also displayed in the same color on network control command display window 96.

[Operation]

Referring to FIG. 8, visualizing apparatus 174 and backend system 150 therefor operate in the following manner. OpenFlow controller 160 controls each of the switches in OpenFlow network 176 by a flow table, in accordance with given conditions. By way of example, every time a new switch is introduced or a new node is added to OpenFlow network 176, OpenFlow controller 160 generates a flow table such that the state of OpenFlow network 176 satisfies prescribed conditions, and distributes it to each switch. Logs resulting from such a process of OpenFlow controller 160 and information related to the traffic of each path of OpenFlow network 176 are transmitted to log server 162, temporarily accumulated, and transmitted to cache DB 170 at appropriate timing. Of these pieces of information, persistent data necessary for drawing the network configuration of network configuration monitoring window 98 are saved in persistent DB 164.

Assume that a certain information service is started on any of the nodes of the network. Information related to the information service (contents, nature, address and the like of the information service) is transmitted from service node 168 to cache DB 170, and cached in cache DB 170. In the present embodiment, service cooperation application 230 (see FIG. 9) is formed by combining existing service nodes in the form of a graph, and saved in DSN storage unit 233 in the form of DSN description 232.

Interpreter 234 of middleware 212 repeatedly interprets the DSN description. Specifically, for each rule in the DSN description, whether or not firing condition thereof is satisfied or not is determined, based on the network status provided from OpenFlow controller 160. If the rule firing condition is satisfied, interpreter 234 executes the rule, whereby an OpenFlow control command sequence 236 is generated and transmitted to OpenFlow controller 160. Further, interpreter 234 stores rule execution logs in log storage device 242. If the control command is a command for setting a communication path between information services, a path identifier will be transmitted from OpenFlow controller 160 as a return value. Interpreter 234 saves this path identifier in a path table storage unit 244 in association with the service cooperation identifier.

At the time of power-on, visualizing apparatus 174 starts drawing of monitoring screen 90 shown in FIG. 3. Specifically, visualizing apparatus 174 repeats the following process at every prescribed time interval.

Based on the rule execution logs of DSN stored in log storage device 242, visualizing apparatus 174 draws the service information and information service arrangement information as well as the service cooperation graph, of service cooperation execution monitoring window 92. When drawing the service cooperation graphs, it draws the edges of different service cooperation graphs in different colors.

Visualizing apparatus 174 reads the rule execution logs stored in log storage device 242 and draws them on rule execution log display window 94. Further, visualizing apparatus 174 draws traffic log display area 110 of FIG. 6 from the traffic information between information services obtained from OpenFlow controller 160, and draws history of control commands from each of the nodes received by OpenFlow controller 160 on control command display area 112.

Visualizing apparatus 174 draws the network configuration screen image of network configuration monitoring window 98, based on persistent information (topology information of the network and connection information between nodes and switches) transmitted from data transmission module 166. Visualizing apparatus 174 further draws an image representing the amount of traffic flowing through each physical line, superposed on the image of each physical line on the network configuration screen image. This image is drawn based on the traffic information of each physical line obtained from OpenFlow controller 160 and on the maximum bandwidth allocated to each physical line.

Visualizing apparatus 174 further draws, superposed on the image of each physical line on the network configuration screen image, the flow of data between information services flowing over the physical line, in different colors for different service cooperation applications. This color is determined by finding which service cooperation application corresponds to the path set on the physical line, by looking up the path table storage unit 244.

If the network topology changes, information of the change is transmitted from OpenFlow controller 160 to and held by persistent DB 164. Further, this information is applied through data transmission module 166 to visualizing apparatus 174 and, as a result, the drawing of network configuration on network configuration monitoring window 98 is changed to reflect the new topology.

When network status changes and fails to satisfy a requirement of service cooperation application, interpreter 234 interprets rules related to the requirement and generates an OpenFlow control command sequence that changes a virtual network configuration to satisfy the requirement, and applies the sequence to OpenFlow controller 160. In response to the control command, OpenFlow controller 160 re-makes the flow table and distributes it to each switch. Each switch changes the data transmission path in accordance with the flow table and whereby the requirement of service cooperation application comes to be satisfied. The rule execution logs of the interpreter 234 at this time are output to log storage device 242, the resulting operation results of OpenFlow controller 160 and the network status are stored in log server 162 of FIG. 8, and transmitted to visualizing apparatus 174 at every prescribed time interval through cache DB 170 and data transmission module 172. Based on the information, visualizing apparatus 174 updates the service cooperation execution monitoring window 92, rule execution log display window 94, network control command display window 96 and network configuration monitoring window 98, at every prescribed time interval. As a result, execution of rules of DSN description and the state of transfer of the data of information service related to the rules come to be displayed substantially on a real time basis. Since pieces of information related to the same information service are displayed in the same color, the correspondence relation of paths on physical network of data transfer for a certain information service and the state of transfer thereof are displayed in an easily understandable manner. The rule execution logs and the network control commands are displayed synchronized with the display of data transfer on service cooperation execution monitoring window 92 and network configuration monitoring window 98 and, therefore, what rule or rules have been executed and how the network configuration has been changed accordingly can easily be understood.

In this manner, the data flow in the service cooperation application and the data flow on the physical network are displayed synchronized with each other in a manner allowing easy understanding of the relation between each other. This enables a network administrator to monitor behaviors of the service cooperation application and of the physical network in a comprehensive manner.

[Hardware Configuration]

Figure 11:
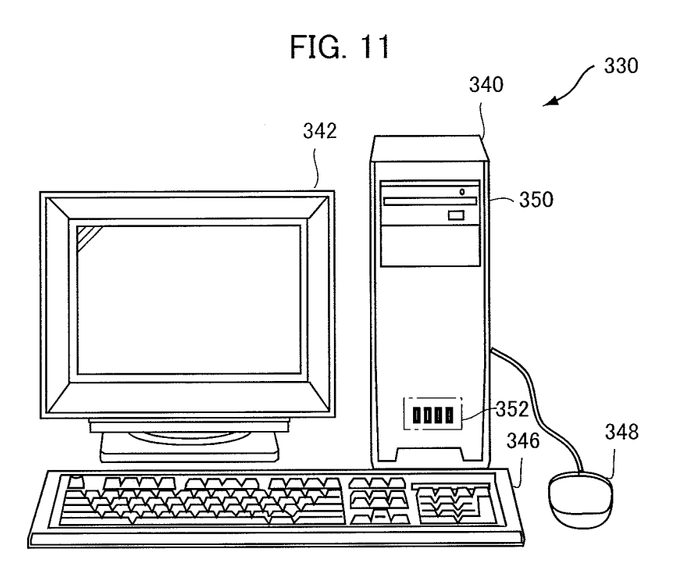
FIG. 11 shows an appearance of a computer system realizing the visualizing apparatus in accordance with an embodiment of the present invention.

Visualizing apparatus 174 in accordance with the embodiment above can be realized by computer hardware and a computer program described above running on the computer hardware. FIG. 11 shows an appearance of computer system 330, and FIG. 12 shows an internal structure of computer system 330.

Referring to FIG. 11, a computer system 330 includes a computer 340 having a memory port 352 and a DVD (Digital Versatile Disc) drive 350, a keyboard 346, a mouse 348 and a monitor 342.

Figure 12:
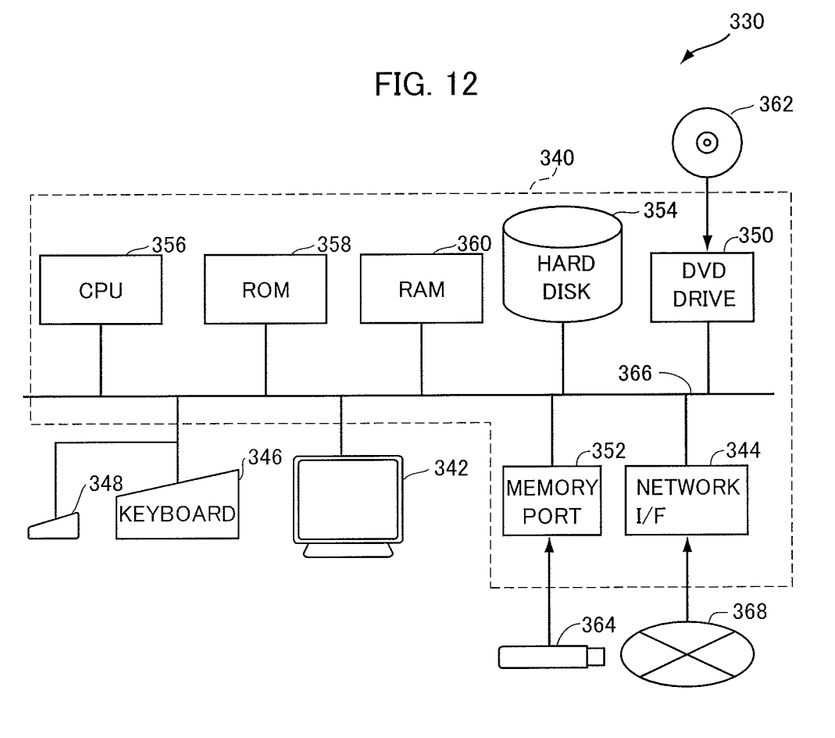
FIG. 12 is a block diagram showing an internal configuration of the computer shown in FIG. 11.

Referring to FIG. 12, computer 340 includes, in addition to memory port 352 and DVD drive 350, a CPU (Central Processing Unit) 356, a bus 366 connected to CPU 356, memory port 352 and DVD drive 350, a read only memory (ROM) 358 storing a boot program and the like, and a random access memory (RAM) 360, connected to bus 366, for storing program instructions, system programs, work data and the like. Computer system 330 further includes a network interface (I/F) 344 providing connection to a network, allowing communication with other terminals.

A computer program causing computer system 300 to operate as various functional units of visualizing apparatus 174 of the embodiment described above is stored in a DVD 362 or a removable memory 364 to be mounted on DVD drive 350 or memory port 352, and transferred to hard disk 354. Alternatively, the program may be transmitted through network 368 to computer 340 and stored in hard disk 354. The program may be loaded directly to RAM 360 from DVD 362, removable memory 364 or through network, 368.

The program includes a sequence of instructions including a plurality of instructions to cause computer 340 to function as various functional units of visualizing apparatus 174 in accordance with the embodiment described above. Some of the basic functions necessary to cause computer 340 to operate are provided by an operating system running on computer 340, by a third-party program, or various programming tool kits or program library installed in computer 340. Therefore, the program itself may not include all the functions necessary to realize the system and method of the present embodiment. The program have only to include those of the instructions which realize the functions of the system as described above by calling appropriate function or functions or appropriate program tools in the programming tool kits in a controlled manner to obtain desired results. Naturally, the program may provide all necessary functions by itself.

In the embodiment described above, DSN description 232, rule execution logs of DSN description by interpreter 234, dictionary 240, path table storage unit 244 and the like are stored in RAM 360 or hard disk 354. Specifically, DSN storage unit 233, log storage device 242 and the like shown in FIG. 9 are realized by the hard disk. These values may further be stored in removable memory 364 such as a USB memory, or may be transmitted to another computer through a communication medium such as a network.

The operation of computer system 330 when it executes the computer program is well known. Therefore, details thereof will not be described here.

In the embodiment described above, on monitoring screen 90, service cooperation execution monitoring window 92, rule execution log display window 94, network control command display window 96 and network configuration monitoring window 98 are displayed simultaneously. As a result, pieces of information related to the network can advantageously be viewed in a comprehensive manner. The present invention, however, is not limited to such an embodiment. By way of example, only the service cooperation execution monitoring window 92 and the network configuration monitoring window 98 may be displayed simultaneously and in synchronization with each other. It is naturally understood that the rule execution log display window 94 or the network control command display window 96 may be additionally displayed.

Further, in the embodiment above, the color of graph edge of each service cooperation is determined based on the path identifier returned from OpenFlow controller 160 to middleware 212 when a communication path setting command between information services is executed. The present invention, however, is not limited to such an embodiment. By way of example, identifiers of communication paths between information services may be all managed by middleware 212, and OpenFlow controller 160 may pass an identifier of a communication path to be newly set as an execution parameter.

In the embodiment above, OpenFlow is adopted to enable software control of changes to the network configuration. The present invention, however, is not limited to such an embodiment. By way of example, PIAX or the like may be adopted.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is usable for network management industries and apparatuses therefor, enabling comprehensive understanding of behaviors of various information services and of physical networks and enabling efficient management thereof.

REFERENCE SIGNS LIST

30 OpenFlow network
40 switches
42, 160 OpenFlow controller
50, 52, 54, 56 OpenFlow switch
90 monitoring window
92 service cooperation execution monitoring window
94 rule execution log window
96 network control command window
98 network configuration monitoring window
100 service information display area
102 service cooperation graph display area
104 service position display area
110 traffic log display area
112 control command display area
120, 122, 124, 126, 128, 130 switch
140, 142 data transfer path
150 back-end system
162 log server
164 persistent DB
166, 172 data transmission module
168 service node
170 cache DB
174 visualizing apparatus
176 OpenFlow network
212 middleware
234 interpreter
236 OpenFlow control command sequence
242 log storage device
244 path table storage unit

The invention claimed is:

1. A visualizing system for visualizing network configuration and operation, wherein logical configuration of said network is changeable by software interpreting a network control command, and said network includes a plurality of switches,
a controller controlling, by a network control command, a data transfer path through said plurality of switches, and
cache means for obtaining information related to status of operation of said network from said controller on a real-time basis, and for converting to and caching the information in a predetermined format;
said visualizing system comprising:
- a display device;
- a cache database obtaining, on real-time basis, information related to information services applied from service nodes providing the information services on said network;
- log storage means for periodically receiving information related to the status of operation of said network from said cache means and adding and storing the information in said cache database;
- first drawing means for periodically reading said information related to the information services from said cache database and for drawing a first image on said display device, the first image representing a cooperation between information services provided on said network; and
- second drawing means for reading said information related to the status of operation of said network from said cache database in synchronization with said first drawing means periodically reading said information related to the information services from said cache database, and for drawing a second image on said display device, the second image representing what connection between which node and which switch on a physical network realizes said cooperation between the information services;
wherein an application is formed by said cooperation between information services on the physical network and said network realized by said cooperation between the information services is defined independently from the physical network;
wherein as a result, said first and second drawing means update drawings such that a change in cooperation between said information services and a change in a status of communication between the nodes and the switches of said physical network are displayed in synchronization with each other, using logs stored in said log storage means.

2. The visualizing system according to claim 1, wherein a plurality of cooperations may exist between said information services;
said first drawing means represents each cooperation between said information services as a graph having service nodes providing the information services as vertexes and a path of data movement between the information services as an edge, and
draws different edges in different colors corresponding to respective cooperations between said information services;
said second drawing means displays a topology on said physical network as a graph having nodes and switches on the network as vertexes and a physical line between any of the nodes and switches on the network as an edge; and
among the edges of said graph drawn by said second drawing means, along an edge representing a physical line functioning as an edge of a cooperation between said information services, said second drawing means draws a line representing a data transfer path in the same color as the drawing color of said edge.

3. The visualizing system according to claim 2, wherein said service cooperation may include a plurality of units; and
said second drawing means draws, along that one of said physical lines which functions as edges of two units among said plurality of service cooperation units, lines representing different data transfer paths in same colors as drawing colors of said two edges respectively.

4. The visualizing system according to claim 3, further comprising:
rule storage means for storing a rule describing, in declarative description, a request from the cooperation between said information services to the network, the rule stored in said rule storage means including a condition to be satisfied by status of the network or status of the information services and a process or processes to be executed when the condition is satisfied, and any of the processes including a process for issuing a control command to said controller in accordance with the rule;
rule interpreting means for repeatedly determining whether any of the rules stored in said rule storage means has said condition satisfied based on said information related to the information service and based on information obtained by said network status obtaining means, and executing the process defined by the rule of which condition is satisfied;
rule execution log storage means for storing logs of process execution in accordance with the rule by said rule interpreting means; and
third drawing means for repeatedly reading execution logs stored in said rule execution log storage means and for drawing on a screen of said display device in synchronization with drawings by said first and second drawing means.

5. The visualizing system according to claim 4, further comprising fourth drawing means for drawing information obtained by said network status obtaining means on the screen of said display device in synchronization with drawing by said third drawing means.

* * * * *